United States Patent
Syrjarinne

(10) Patent No.: US 10,694,382 B2
(45) Date of Patent: Jun. 23, 2020

(54) AUTHENTICATION OF SATELLITE NAVIGATION SYSTEM RECEIVER

(71) Applicant: HERE Global B.V., Eindhoven (NL)

(72) Inventor: Jari Tapani Syrjarinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 429 days.

(21) Appl. No.: 15/634,011

(22) Filed: Jun. 27, 2017

(65) Prior Publication Data
US 2018/0372878 A1 Dec. 27, 2018

(51) Int. Cl.
*H04W 12/06* (2009.01)
*G01S 19/05* (2010.01)
*G01S 19/21* (2010.01)
*H04L 29/06* (2006.01)
*H04L 9/08* (2006.01)
(Continued)

(52) U.S. Cl.
CPC ......... *H04W 12/0609* (2019.01); *G01S 19/05* (2013.01); *G01S 19/215* (2013.01); *H04L 9/0869* (2013.01); *H04L 9/3213* (2013.01); *H04L 9/3242* (2013.01);
(Continued)

(58) Field of Classification Search
CPC .. G01S 19/05; G01S 19/215; H04W 12/0609; H04W 12/06; H04W 12/00503; H04L 9/3213; H04L 9/3297; H04L 9/3242; H04L 9/0869; H04L 63/0846; H04L 2209/38
See application file for complete search history.

(56) References Cited

U.S. PATENT DOCUMENTS 8,370,629 B1    2/2013  Ngo et al.
8,948,392 B2    2/2015  Chassagne
(Continued)

FOREIGN PATENT DOCUMENTS

DE    112015000695 T5    2/2014
EP          2397868 A1    12/2011
(Continued)

OTHER PUBLICATIONS

Baldini et al.: "Robust GNSS Services for Road Transportation", European Union 2016 (http://publications.jrc.ec.europa.eu/repository/bitstream/JRC104649/robust_gnss_v10_onlinecorrect_pdf).

(Continued)

*Primary Examiner* — Bernarr E Gregory
*Assistant Examiner* — Fred H Mull
(74) *Attorney, Agent, or Firm* — Lempia Summerfield Katz LLC

(57) ABSTRACT

A mobile device, which includes a satellite navigation system receiver with embedded confidential seed key for generating Galileo message authentication codes (MACs) for any desired time instant, generates a MAC for a given time instant and transmits the MAC or a derived code as a verification code. A receiving entity authenticates the satellite navigation system receiver by comparing the obtained verification code with an available verification code known to be valid for the given time instant. The satellite navigation system receiver is considered to be an authentic satellite navigation system receiver of a mobile device only, in case the at least one obtained verification code matches the available verification code. Selected further actions are enabled only, if the satellite navigation system receiver is considered an authentic satellite navigation system receiver.

20 Claims, 6 Drawing Sheets

(51) Int. Cl.
H04L 9/32 (2006.01)
H04W 12/00 (2009.01)
(52) U.S. Cl.
CPC ........ *H04L 9/3297* (2013.01); *H04L 63/0846* (2013.01); *H04W 12/06* (2013.01); *H04W 12/00503* (2019.01)

(56) References Cited

U.S. PATENT DOCUMENTS

| | | | |
|---|---|---|---|
| 9,217,792 B2 | 12/2015 | Wu | |
| 9,467,293 B1 * | 10/2016 | Brainard | G06Q 20/3823 |
| 9,470,796 B2 | 10/2016 | Jantz et al. | |
| 2003/0171860 A1 * | 9/2003 | Fan | G01S 5/0027 701/32.3 |
| 2008/0080712 A1 * | 4/2008 | Huang | G01S 5/0027 380/258 |
| 2009/0124267 A1 | 5/2009 | Del Castillo | |
| 2009/0215467 A1 | 8/2009 | Shim et al. | |
| 2010/0007554 A1 | 1/2010 | Wang et al. | |
| 2011/0296184 A1 | 12/2011 | Tran | |
| 2013/0176168 A1 | 7/2013 | Lo et al. | |
| 2013/0251150 A1 * | 9/2013 | Chassagne | G01S 1/042 380/270 |
| 2014/0327541 A1 * | 11/2014 | Ani | G01S 19/16 340/539.13 |
| 2014/0351576 A1 | 11/2014 | Enge et al. | |
| 2016/0154106 A1 | 6/2016 | Fernandez-Hernandez | |
| 2017/0031027 A1 | 2/2017 | Jantz | |
| 2017/0031028 A1 | 2/2017 | Fernandez Hernandez | |
| 2017/0188197 A1 * | 6/2017 | Finlow-Bates | H04W 4/025 |

FOREIGN PATENT DOCUMENTS

| | | |
|---|---|---|
| EP | 2708917 A1 | 3/2014 |
| EP | 2746810 A1 | 6/2014 |
| EP | 2770340 A1 | 8/2014 |
| EP | 2799908 A1 | 11/2014 |
| WO | WO2015164609 A1 | 10/2015 |

OTHER PUBLICATIONS

European GNSS Agency (GSA): "Development, Supply and Testing of a Galileo Open Service Authentication User Terminal (OS-NMA) for the GSA"; Annex I to Invitation to Tender 'Tender Specifications', Ref: GSA/OP/23/16/Annex I, Issue: 1, Date: Jan. 27, 2016 (https://www.gsa.europa.eu/development-supply-and-testing-galileo-open-service-authentication-user-terminal-os-nma-gsa).
Fernández-Hernández et al.; "A Navigation Message Authentication Proposal for the Galileo Open Service", Navigation: Journal of the Institute of Navigation, vol. 63, No. 1, Spring 2016 (http://spcomnav.uab.es/docs/journals/Navigation-FERNANDEZ2016.pdf).
HERE Positioning: Find out where you are, with or without GPS (https://here.com/en/products-services/products/here-positioning) Apr. 24, 2017.
Walker et al.: "Galileo Open Service Authentication: a Complete Service Design and Provision Analysis", Conference Paper Sep. 2015 (http://www.galileocsdemo.eu/wpcontent/uploads/2017/02/2015-ion-osnmawalker-iongnss2015.pdf).
Wesson et al.; University of Texas at Austin: "Practical Cryptographic Civil Gps Signal Authentication" (https://radionavlab.ae.utexas.edu/images/stories/files/papers/nma.pdf), Feb. 2012.
Hein, Guenter, et al. "Authenticating GNSS: proofs against spoofs, Part 2." Inside GNSS 2.5 (2007): 58-63.
Lytvyn, Mykhailo, Albert Kemetinger, and Philipp Berglez. "How can an orbit prediction module speed up the TTFF and help to authenticate the position?." Satellite Navigation Technologies and European Workshop on GNSS Signals and Signal Processing,(NAVITEC), 2012 6th ESA Workshop on. IEEE, 2012.
PCT International Search Report and Written Opinion of the International Searching Authority dated Aug. 3, 2018 for corresponding PCT/EP2018/067024.
PCT International Search Report and Written Opinion of the International Searching Authority dated Sep. 27, 2018 for corresponding PCT/EP2018/067018.

* cited by examiner

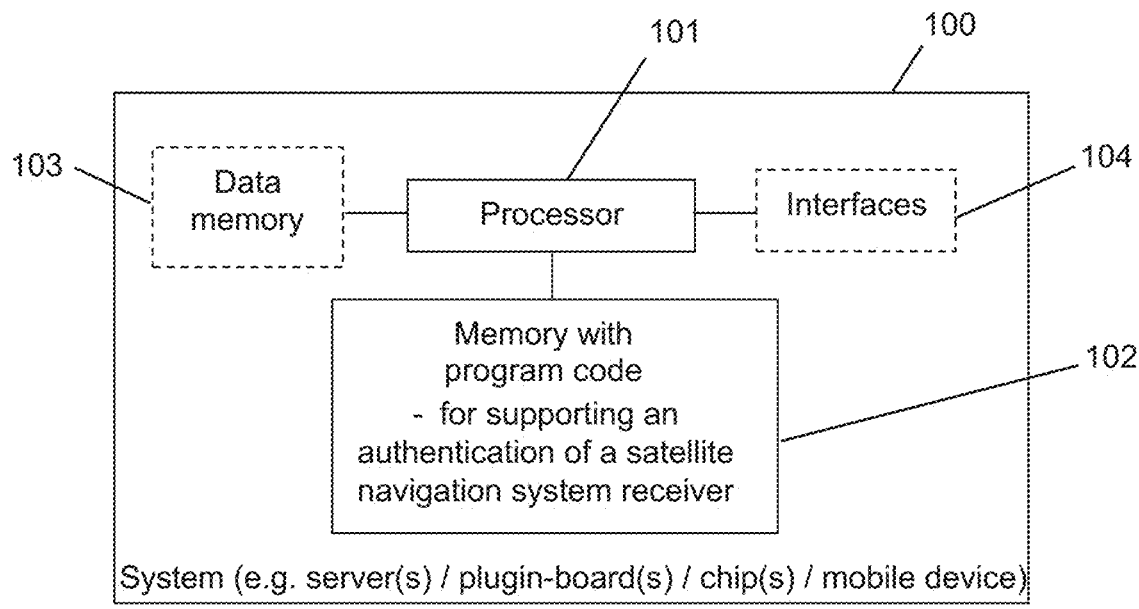

FIG. 1

Obtain a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant. — 201

Compare the at least one obtained verification code with at least one available verification code known to be valid for the given time instant, wherein the entity is considered to be an authentic satellite navigation system receiver of a mobile device only, in case the at least one obtained verification code matches the at least one available verification code. — 202

Enable selected further actions only, if the entity is considered an authentic satellite navigation system receiver of a mobile device. — 203

FIG. 2

AUTHENTICATION OF SATELLITE NAVIGATION SYSTEM RECEIVER

FIELD OF THE DISCLOSURE

The disclosure relates to the field of positioning and more specifically to an authentication of satellite navigation system receivers.

BACKGROUND

Global navigation satellite systems (GNSS) are the backbones of positioning and navigation solutions. It has been estimated that the total number of GNSS receivers in the markets has exceeded 4 billion units by the end of 2016. A GNSS receiver (e.g. in the form of a chipset) can be found in every smartphone, smartwatch, new car, high-end drone etc. The volumes are still rapidly growing due to the GNSS integration into Internet of Things (IoT) devices.

It is commonly known that a standalone GNSS receiver does not work satisfactorily in urban areas and it also has certain fundamental bottlenecks in its performance that make it non-ideal e.g. for mass market devices and their use cases. GNSS was originally aimed for outdoor (and continuous signal reception) use only, hence the GNSS signals and the data link from the satellites to the receiver were not designed for weak signal conditions nor to the fastest possible time-to-first-fix. Also, the fact that the satellites are far in the space (at an altitude of 20,000 km) and solar-powered means that no engineering effort will be enough to overcome the physical limitations related to limited transmission power and to the radio propagation loss. Solutions to improve the performance of GNSS receivers need to found on other technologies and radios.

Cellular operators and mobile phone manufactures started to develop GNSS assistance data services roughly 20 years ago, to find a solution for the mentioned GNSS performance gaps. It was discovered that the ranging signal transmitted from the satellites was still strong enough in urban environments to be received with the novel high-sensitivity GNSS receivers, but the navigation data interleaved with the ranging signals become too noisy and erroneous for successful demodulation. (Navigation data contains the satellite orbit and clock parameters among other constellation status info, which are essential for position calculation.) Hence, a solution capable of capturing the satellite navigation data and transmitting that data via an alternative route to the receivers would drastically improve the performance and make GNSS acceptable even for emergency call positioning. As a result, assisted-GPS (later assisted-GNSS, A-GNSS) technology was created, standardized and adopted for commercial use. Today, all the GNSS receivers in the smartphones are A-GNSS receivers i.e. inherently combining GNSS and terrestrial systems into one positioning technology.

The GNSS family consists of several satellite constellations. The first and most widely used is the system developed and operated by the US Air Forces i.e. Naystar GPS, in short: GPS (global positioning system). GPS has been in operational use since 1980's. The Russian counterpart from the Cold War era is GLONASS, which has now been modernized and offering performance equal to GPS. China is currently building up their own global system called Beidou and the EU is ramping up Galileo. In addition to these four global satellite constellations, there exist also regional augmentation systems (satellite based augmentation systems, SBAS) such as the Japanese quasi-zenith satellite system (QZSS) and multi-functional satellite augmentation system (MSAS), the U.S. wide area augmentation system (WAAS), the European geostationary navigation overlay service (EGNOS), the Indian GPS aided geo augmented navigation (GAGAN) system and the Russian GLONASS system for differential correction and monitoring (SDCM).

GNSS constellations offer open service (OS) signals for the civilian and "unauthorized use", and regulated/military signals for the authority and military use, latter of which typically require a specific receiver or encryption keys to use these signals for positioning (even for reception). On the contrary, the structure and format of the OS signals are publicly known, as the interface control documents (ICD) describing the signals and data transmitted by the satellites are freely available. Also, the OS GNSS receivers are commercially available as modules, development kits etc. so it is relatively easy to get access to the GNSS signals and data, even to replicate the signals with perfect receiver compatibility. This "easiness" and openness has led to the development of numerous malicious devices which can be used to "spoof" the GNSS receivers in various ways: either to make them report false position and/or time, or even totally jam/block the performance. None of the existing GNSS systems have any means to authenticate the signals or data the satellites transmit, and hence efficiently avoid spoofing. The lack of signal/service authentication is a very serious risk for the location based services that use GNSS to validate the location of a device or a user e.g. for charging/transactions (road tolls, parking etc.). Especially, for the smartphone use cases this has been seen as one of the major problems.

SUMMARY OF SOME EMBODIMENTS OF THE INVENTION

An example embodiment of a method according to a first aspect comprises, performed by at least one device, obtaining a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant. The method further comprises comparing the at least one obtained verification code with at least one available verification code known to be valid for the given time instant, wherein the entity is considered to be an authentic satellite navigation system receiver of a mobile device only, in case the at least one obtained verification code matches the at least one available verification code. The method further comprises enabling selected further actions only, if the entity is considered an authentic satellite navigation system receiver of a mobile device.

An example embodiment of a first system according to the first aspect comprises means for causing performance of the actions of any embodiment of the method presented for the first aspect. The means may be distributed to one or more devices.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system according to the first aspect comprises at least one processor and at least one memory including computer program code, the at least one memory and the computer program code configured to, with the at least one processor, cause at least one device at least to perform the actions of any embodiment of the presented method according to the first aspect. The at least one processor and/or the at least one memory may belong to a single device, like a server, or be distributed to several devices.

Any of the described systems may comprise only the indicated components or one or more additional components, like a data interface or a data memory or a plurality of servers of a network of servers. Any of the described systems may be a device, be a part of a device or be composed of a plurality of devices.

An example embodiment of a method according to a second aspect comprises, performed by a mobile device with satellite navigation system receiver, generating at least one message authentication code for a given time instant based on at least one confidential seed key, wherein message authentication codes are defined to authenticate navigation data for Galileo for a respective time instant and wherein the at least one confidential seed key is embedded in the satellite navigation system receiver. The method further comprises assembling a message including at least one verification code, wherein the at least one verification code comprises the generated at least one message authentication code or at least one secondary code derived from the generated at least one message authentication code. The method further comprises causing a transmission of the assembled message to enable a receiving entity to authenticate the satellite navigation system receiver.

An example embodiment of a first apparatus according to the second aspect comprises means for causing performance of the actions of any embodiment of the method presented for the second aspect.

The means of the apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus according to the second aspect comprises at least one processor and at least one memory including computer program code, the at least one memory and the computer program code configured to, with the at least one processor, cause a device at least to perform the actions of any embodiment of the presented method according to the second aspect.

Any of the described apparatuses may comprise only the indicated components or one or more additional components, like a satellite navigation system receiver, a data interface, a user interface, etc.

Moreover an example embodiment of a non-transitory computer readable storage medium, in which computer program code is stored, is presented for the first and second aspect of the invention, respectively. In each case, the computer program code causes at least one device to perform the actions of any embodiment of the presented method of the first or second aspect of the invention when executed by at least one processor.

In either case, the computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself is considered an example embodiment of the invention according to the first or second aspect as well. The computer program code could also be distributed to several computer readable storage mediums.

In certain embodiments, any of the presented methods is an information providing method, and any of the presented first systems is an information providing system and any of the presented first apparatuses is an information providing apparatus. In certain embodiments, the means of the presented first system and/or of the first apparatus are processing means.

In certain embodiments, any of the presented methods is a method for supporting an authentication of a satellite navigation system receiver. In certain embodiments, any of the presented systems is a system for supporting an authentication of a satellite navigation system receiver. In certain embodiments, any of the presented apparatuses is an apparatus for supporting an authentication of a satellite navigation system receiver.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a schematic block diagram of an example embodiment of a system according to the first aspect;

FIG. 2 is a flow chart illustrating an example embodiment of a method according to the first aspect;

DETAILED DESCRIPTION OF THE FIGURES

Figures 3, 4:
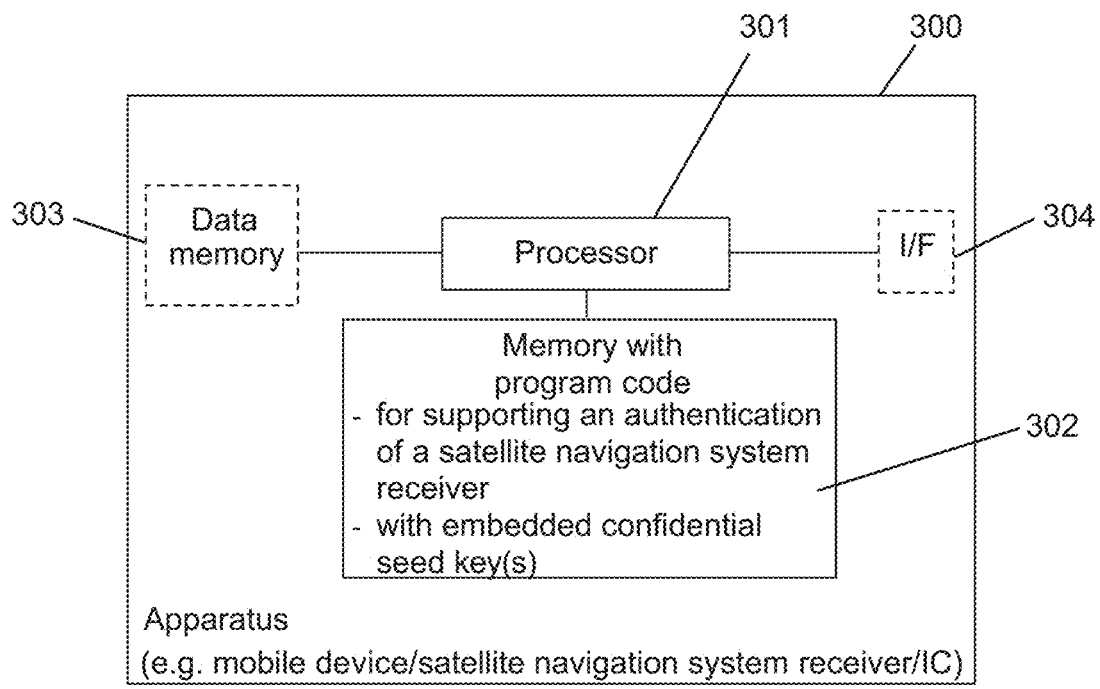
FIG. 3 is a schematic block diagram of an example embodiment of an apparatus according to the second aspect.
FIG. 4 is a flow chart illustrating an example embodiment of a method according to the second aspect.

FIG. 1 is a schematic block diagram of an example embodiment of a system 100 according to the first aspect.

System 100 comprises at least one processor 101 and, linked to the at least one processor 101, at least one memory 102. The at least one memory 102 stores computer program code for supporting authentication of satellite navigation system receivers. The computer program code may be example computer program code according to the first aspect, and the at least one memory 102 may be an example computer readable medium according to the first aspect. The at least one processor 101 is configured to execute computer program code stored in the at least one memory 102 in order to cause at least one device to perform desired actions.

System 100 may be a device, like a mobile device or a computer/server providing a service to various mobile devices, or it may be a combination of devices, like computers/servers in the Cloud. System 100 may equally be a module, like a chip, circuitry on a chip or a plug-in board, for a device. Processor 101 may be linked to various other, optional components of system 100, for instance to a data memory 103 and/or to data interfaces 104.

An example operation of system 100 will now be described with reference to the flow chart of FIG. 2. The operation is an example embodiment of a method according to the first aspect. The at least one processor 101 and the program code stored in the at least one memory 102 cause at least one device to perform the operation when program code is retrieved from the at least one memory 102 and executed by the at least one processor 101. It is to be understood that the at least one processor 101 may comprise or have access to at least one working memory for this purpose, for example in the form of a random access memory (not shown). The at least one device that is caused to perform the operation may be or belong to system 100, or comprise system 100.

The at least one device obtains a message, which includes at least one verification code, from an entity indicating to be a satellite navigation system receiver of a mobile device. The at least one verification code comprises at least one message authentication code for a given time instant or at least one secondary code derived from least one message authentication code for a given time instant, wherein message authentication codes are defined to authenticate navigation data for Galileo for a respective time instant. (action 201) The indication that the entity is a satellite navigation system receiver may be an explicit or implicit indication. An implicit indication may be given for instance by a used type of message that is defined for use by satellite navigation system receivers, like an assistance data request message. The message authentication codes may be defined for instance to authenticate navigation data broadcast by Galileo satellites.

The at least one device compares the at least one obtained verification code with at least one available verification code known to be valid for the given time instant. The entity is considered to be an authentic satellite navigation system receiver of a mobile device only, in case the at least one obtained verification code matches the at least one available verification code. (action 202) An authentic satellite navigation system receiver of a mobile device may be assumed to comprise at least one securely embedded confidential seed key as a basis for generating message authentication codes for given time instants.

The at least one device enables selected further actions only, if the entity is considered an authentic satellite navigation system receiver of a mobile device. (action 203) The selected further actions may be in particular, though not exclusively, any actions that involve safety and/or reliability issues. Other actions, like generating an error message, may not be prevented. It is to be understood that optionally, further criteria may have to be met to enable the selected further actions. To provide just one example, it may be required in addition that the obtained message comprises a registered identifier.

FIG. 3 is a schematic block diagram of an example embodiment of an apparatus 300 according to the second aspect. Apparatus 300 comprises at least one processor 301 and, linked to the at least one processor 301, at least one memory 302. The at least one memory 302 stores computer program code for supporting an authentication of a satellite navigation system receiver. The computer program code may be example computer program code according to the second aspect, and the at least one memory 302 may be an example computer readable medium according to the second aspect. The at least one processor 301 is configured to execute computer program code stored in the at least one memory 302 in order to cause a device to perform desired actions.

Apparatus 300 may be a device, like a handheld mobile user device or an IoT device. Apparatus 300 may equally be a module, like a chip, circuitry on a chip or an integrated circuit, for a device. It could also be or comprise for instance a satellite navigation system receiver. Processor 301 may be linked to various other, optional components of apparatus 300, for instance to a data memory 303, to data interfaces 304 and/or to a user interface.

An example operation of apparatus 300 will now be described with reference to the flow chart of FIG. 4. The operation is an example embodiment of a method according to the second aspect. The at least one processor 301 and the program code stored in the at least one memory 302 cause a mobile device with satellite navigation system receiver to perform the operation when program code is retrieved from the at least one memory 302 and executed by the at least one processor 301. The mobile device may correspond to the mobile device mentioned with reference to action 201 of FIG. 2. It is to be understood that processor 301 may comprise or have access to a working memory for this purpose, for example in the form of a random access memory (not shown). The device that is caused to perform the operation may be or belong to apparatus 300, or comprise apparatus 300.

The device generates at least one message authentication code for a given time instant based on at least one confidential seed key, wherein message authentication codes are defined to authenticate navigation data for Galileo for a respective time instant and wherein the at least one confidential seed key is embedded in the satellite navigation system receiver. (action 401) The seed key enables a generation of a message authentication code for any desired time instant. The seed key may be securely embedded in the satellite navigation system receiver in any way that renders a reading from outside of the satellite navigation system receiver at least difficult. The message authentication codes may be defined again for instance to authenticate navigation data broadcast by Galileo satellites.

The device assembles a message including at least one verification code. The at least one verification code comprises the generated at least one message authentication code or at least one secondary code derived from the generated at least one message authentication code. (action 402)

The device causes a transmission of the assembled message to enable a receiving entity to authenticate the satellite navigation system receiver. (action 403) The receiving entity may belong for instance to the at least one device performing the actions of FIG. 2.

The European Galileo system is the youngest member in the GNSS family. The ICD specification and hence the signals/data have not yet been completely defined leaving an opportunity to introduce "add-on features" to the Galileo OS, even to the existing satellites in the constellation.

The European GNSS Agency (GSA) introduced in 2016 a plan to add a method for Navigation Message Authentication (NMA) to the Galileo OS signals aka OS-NMA. The OS-NMA may be taken into testing use in late 2018/early 2019 leading to a full operational implementation within few coming years. The exact details of the Galileo OS-NMA may be introduced in 2018 in an updated version of Galileo OS ICD. Still, the main principles of the coming OS-NMA feature may include:

- OS-NMA will authenticate only the Navigation Data transmitted by the satellites, not the ranging signal.
- OS-NMA will be included in all the satellites.
- OS-NMA will be backwards compatible using some of the "reserved bits" in the current Navigation Data specification.
- OS-NMA will use GNSS system time as one of the inputs to create a message authentication codes (MAC).
- Receivers will need at least a public key to decode and validate the authentication codes included in the Navigation Data. If the message authentication code (MAC) created by a receiver (via current time) matches with the code sent by the satellite at the given time, the navigation data is accepted by the receiver.

The present embodiments are based on the consideration that A-GNSS services are typically serving any device with the required access credentials. There is no reliable method to verify whether the device is a device comprising a real GNSS receiver and not, for example, a bot mimicking a real GNSS receiver for malicious or harmful purposes.

Certain embodiments therefore provide that the planned mechanism for validating Galileo message authentication codes is used in addition for authenticating satellite navigation system receivers. The ability of a satellite navigation system receiver to create at least one valid message authentication code for any given time instant is an indication that the satellite navigation system receiver is a certified receiver, in which at least one seed key enabling a generation of message authentication codes is securely embedded. The at least one seed key may be granted to the receiver manufacturer and securely embedded e.g. into the firmware of the receiver. The satellite navigation system receiver may be for instance a Galileo receiver or a GNSS receiver supporting reception and processing of Galileo signals as well as signals of at least one other satellite navigation system. Certain functions, like transmitting sensitive data or processing received data, may be enabled only, if a satellite navigation system receiver has been authenticated.

While the key management policy or mechanism for the code creation has not yet been published by the GSA, it is to be understood that the generation and verification of Galileo message authentication codes for the approach according to the invention may be implemented for instance in compliance with any future standard relating to Galileo OS-NMA.

Certain embodiments may have the effect that the transmission and/or use of sensitive data may be rendered more secure. This may facilitate the use of A-GNSS for mass market devices, like IoT devices. Certain embodiments of the invention may have the effect that there is no need to define an additional authentication method, as the message authentication codes defined for Galileo may be used to authenticate GNSS receivers as well.

System 100 illustrated in FIG. 1 and the method illustrated in FIG. 2 as well as apparatus 300 illustrated in FIG. 3 and the method illustrated in FIG. 4 may be implemented and refined in various ways.

A message authentication code may be determined for instance using at least one function that receives at least a key and time information as input. For the purpose of authenticating a satellite navigation system receiver, the employed key may be a seed key. Other input may be used in addition, for instance at last one satellite identifier.

In an example embodiment of the first aspect, the further actions comprise providing a service to the satellite navigation system receiver. Such a service may comprise providing positioning assistance data to the satellite navigation system receiver and/or providing predicted positioning assistance data and associated future message authentication codes to the satellite navigation system receiver. This may have the effect that sensitive or otherwise restricted information may only be provided to certified satellite navigation system receivers or to mobile devices comprising a certified satellite navigation system receiver. Alternatively or in addition, the further actions comprise accepting location information of the entity included in the message to be authentic and/or transmitting information on the location of the at least one device to the satellite navigation system receiver. This may for instance have the effect that peer devices may only exchange/use location information if they all comprise a certified satellite navigation system receiver. It is to be understood that various other actions may be restricted as well.

The given time instant for which at least one verification code is provided/obtained may be selected in different ways. It may be selected for instance by the satellite navigation system receiver or the mobile device comprising the satellite navigation system receiver, and the selected time instant may be provided to the at least one device together with the verification code.

In an example embodiment of the first aspect, the at least one device causes transmission of the given time instant for which at least one verification code is desired to the entity of which the verification code is needed. Accordingly, in an example embodiment of the second aspect, the given time instant may be received in a message from the receiving entity. This may have the effect that individual "leaked" message authentication codes cannot be used to pretend that a satellite navigation system receiver is a trusted satellite navigation system receiver.

In an example embodiment of the first aspect, the at least one available verification code comprises at least one message authentication code extracted by the at least one device from a list of message authentication code received from an entity of a trusted source. Alternatively, it may comprise at least one secondary code derived by the at least one device from at least one message authentication code extracted by the at least one device from a list of message authentication code received from an entity of a trusted source. Alternatively, it may comprise at least one secondary code extracted by the at least one device from a list of message authentication code received from an entity of a trusted source. Alternatively, it may comprise at least one message authentication code generated by the at least one device based on at least one stored confidential seed key. Alternatively, it may comprise at least one secondary code derived by the at least one device from at least one message authentication code generated by the at least one device based on at least one stored confidential seed key. The at least one seed key may equally be provided by an entity of a trusted source. An entity of a trusted source may be for instance an entity creating message authentication codes for navigation data for Galileo. The trusted source may be for instance the GSA.

In an example embodiment, the obtained message of the first aspect and/or the assembled message of the second aspect, respectively, is a message comprising a positioning assistance data request; a handshaking message in the scope of assistance data service communication; a message designed for peer-to-peer communications between mobile devices comprising satellite navigation system receivers; a message designed for communications between a mobile device comprising a satellite navigation system receiver and a device offering a location based service; or an internal message within a mobile device comprising the satellite navigation system receiver.

Figure 5:
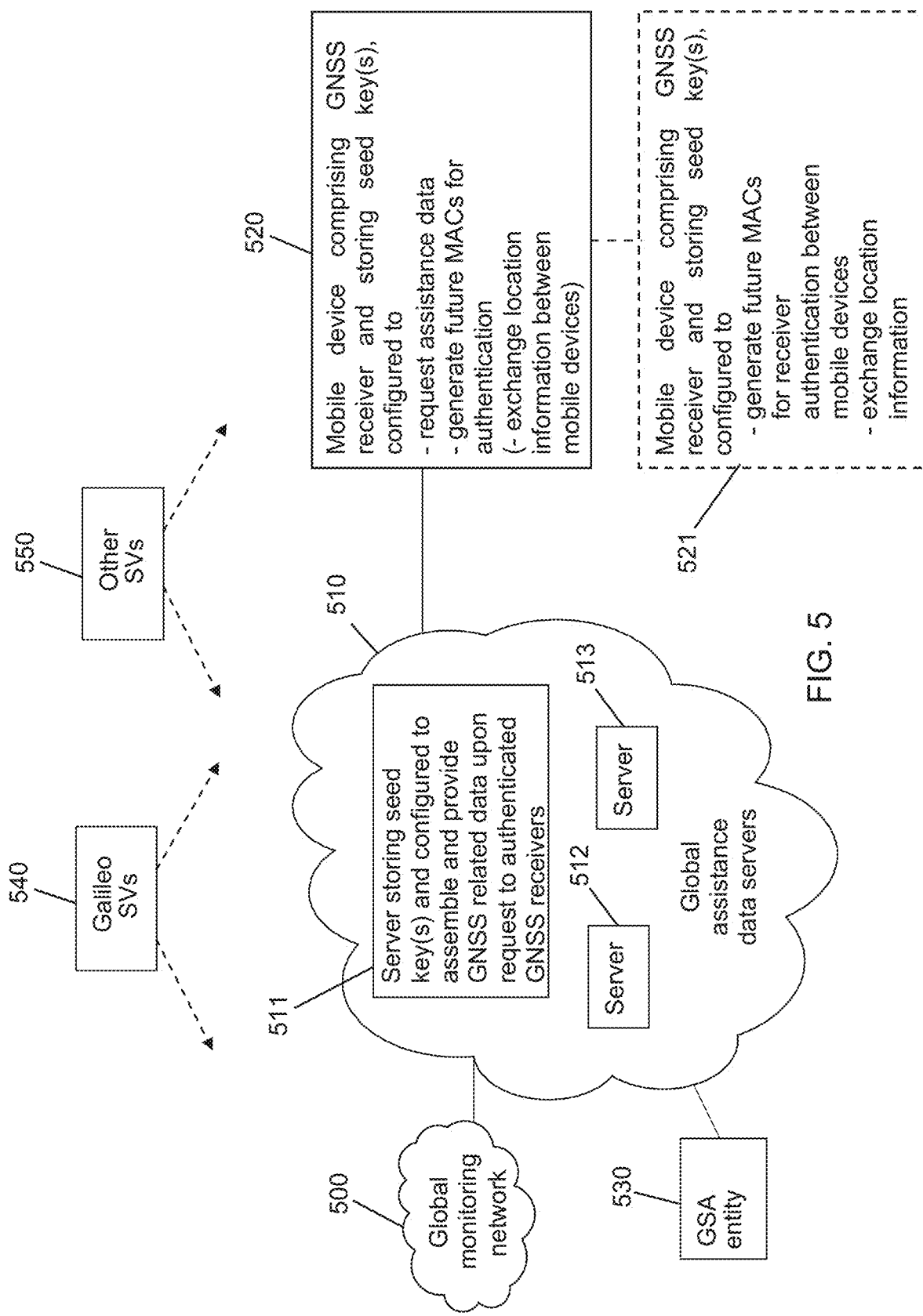
FIG. 5 is a schematic block diagram of an example embodiment of a comprehensive system.

FIG. 5 is a schematic block diagram of first example embodiment of a comprehensive system supporting an authentication of satellite navigation system receivers.

The system comprises a global monitoring network 500, global assistance data servers 510, at least one mobile device 520, optionally a further mobile device 521, and a GSA entity 530. Satellites (or space vehicles SV) 540, 550 of different satellite navigation systems broadcast satellite signals, which include navigation data.

The satellites include Galileo satellites 540 as well as— optionally—satellites 550 of at least one further satellite navigation system, including for instance GPS, GLONASS, Beidou and/or one or more other SBAS. Satellites of future satellite navigation systems may be included as well, once available.

The global monitoring network 500 comprises monitoring receivers that are configured to receive satellite signals from respectively visible satellites 540 and 550. The monitoring receivers are configured to extract and forward navigation data and associated data from the signals. They may be distributed across the world.

The global assistance data servers 510 comprise a plurality of servers 511, 512, 513, which are distributed across the world as well. Each of the servers is configured to receive data collected by the global monitoring network 500, to assemble and provide information including GNSS assistance data and optionally further sensitive data upon request of mobile devices 520, and to store at least one seed key for authenticating mobile devices 520. Any of servers 511-513 by themselves or in combination may correspond to system 100 of FIG. 1 and include corresponding components. In this case, interfaces 104 may enable a data communication with the global monitoring network 500, GSA entity 530 and mobile devices 520, for instance via the Internet; and data memory 103 may enable storage of any data that is used for assembling assistance data. It is to be understood that the functions of the global assistance data servers 510 may also be performed in the cloud in a distributed manner. For instance, there could be a single server that is responsible for storing and applying the at least one seed key and that is configured to communicate exclusively with other servers of the global assistance data servers 510 in a secure manner.

The global monitoring network 500 is linked to the global assistance data servers 510. The connections are safe and secured by VPN and encryption.

GSA entity 530 is configured to store at least one seed key for generating MACs. It may be configured to generate MACs for respective instances in time. It is linked to the global assistance data servers 510 via a safe connection as well.

Mobile device 520 may be any device that is configured to move around and that is expected to be able to determine its own position. It may be for instance a smartphone, a smart watch, a tablet PC, an IoT device or any other mobile device, including industrially used devices. Mobile device 520 may correspond to the apparatus 300 of FIG. 3 and include corresponding components. In this case, interfaces 304 may enable a data communication with the global assistance data servers 510 via a radio link that is used for accessing the Internet; and data memory 303 may enable storage of any data that is used for processing satellite signals and GNSS related data, including GNSS assistance data. Mobile device 520 comprises a GNSS receiver, which may include for instance at least processor 301 and memory 302 of FIG. 3. The term GNSS receiver may relate to a single component or to an assembly of components, like a GNSS chipset. With the GNSS receiver, mobile device 520 is configured to receive signals from satellites 540, 550 of different satellite navigation systems, including at least Galileo. A-GNSS service is an integral part of the GNSS receiver. It is a certified OS-NMA receiver and is configured to generated MAC codes for validating MAC codes received along with navigation data. It is configured to accept navigation data and MACs from other sources than direct satellite broadcasts, namely from an A-GNSS service, as well. This may be achieved by a minor software/firmware modification. The GNSS receiver comprises at least one seed key that has been securely embedded by the receiver manufacturer into the firmware of the GNSS receiver. In addition, the receiver manufacturer may have caused storage of at least one root key that has been derived from the at least one seed key in a memory. Mobile device 520 is configured to request, receive and process GNSS assistance data. Optionally, it may be configured to exchange location information with other mobile devices 521. It is to be understood that the system may comprise a plurality of mobile devices 520.

Optional mobile device 521 is configured to connect to mobile device 520, using e.g. a direct wireless link or an indirect link via a mobile communication network. It equally comprises a GNSS receiver with at least one securely embedded seed key. It is configured to exchange location information with other mobile devices 520.

The distribution of seed keys to servers 511-513 and to manufacturers of mobile devices 520 is controlled and managed by a trusted party, e.g. GSA.

Figure 6:
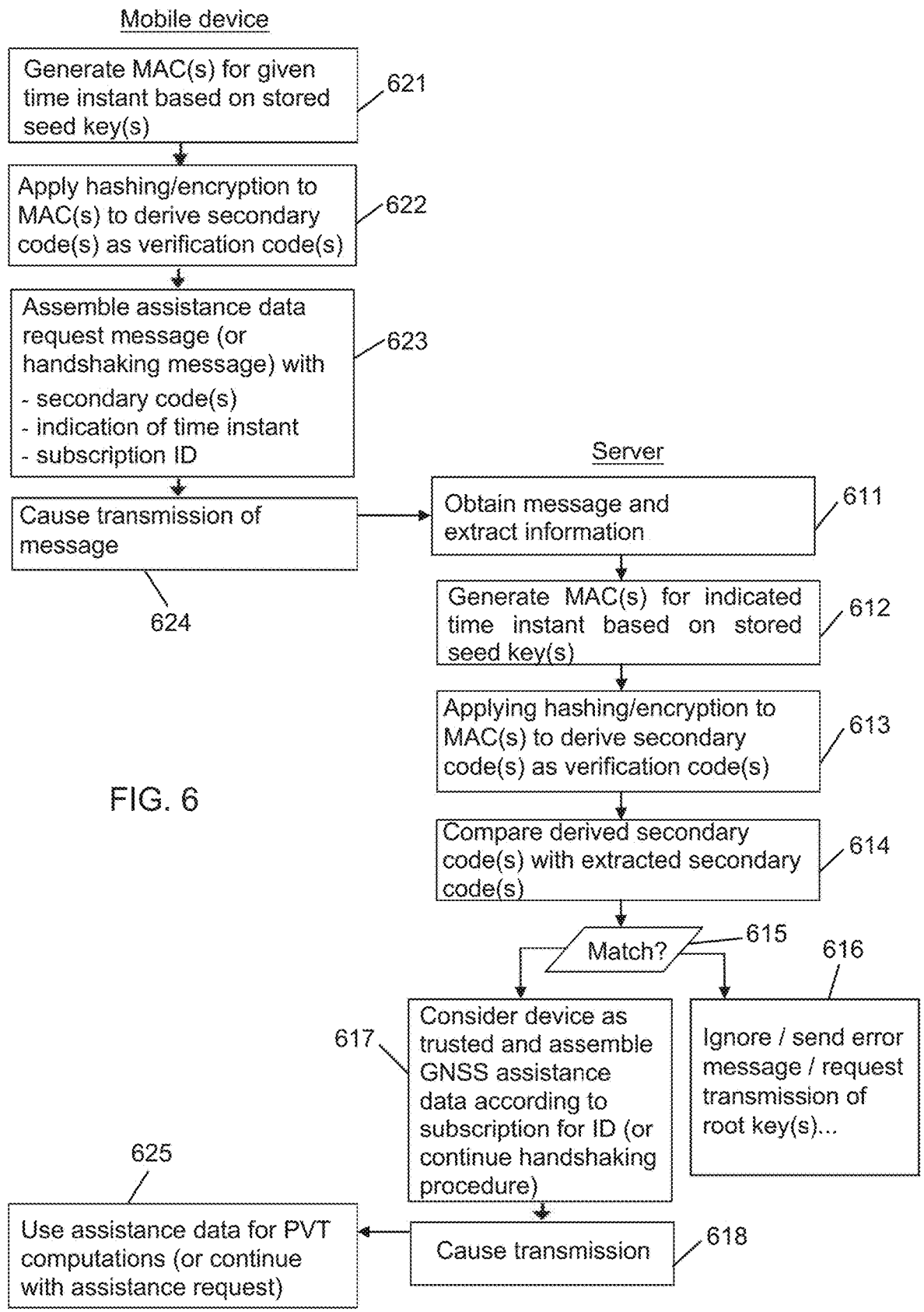
FIG. 6 is a flow chart illustrating an example embodiment of operations in the system of FIG. 5.

FIG. 6 is a flow chart illustrating example operations in the system of FIG. 5. Mobile device 520 is caused to perform the actions presented on the left hand side. Server 511 is caused to perform the actions presented on the right hand side.

In general, monitoring receivers of the global monitoring network 500 receive signals from satellites 540, 550 of various satellite navigation systems, including Galileo. The monitoring receivers extract navigation data and associated data. The harvested navigation data contains real-time data for all supported satellite navigation systems. Only Galileo has a built-in mechanism for authentication.

Data transmitted by Galileo satellites 540 includes navigation data, digital signatures, MACs and one-time keys. The monitoring receivers may store a public key corresponding to a private key that has been used for encoding and signing at least a part of the received data. The monitoring receivers may decode the encoded data, including a MAC, and verify its source using the public key. Furthermore, if a MAC created by the monitoring receivers (using received one-time keys and a given time) matches with a MAC broadcast by a satellite along with navigation data for the given time, the associated navigation data is accepted by the monitoring receivers. The navigation data received from other satellites 550 may be accepted with or without further evaluation, depending e.g. on whether a digital signature is included in the message or whether the message is encrypted.

Any MAC used in the system of FIG. 6 may be generated based on a function or set of functions, which takes as input the given time instant and optionally one or more Galileo satellite IDs. A separate MAC could be generated for each satellite ID, or a common MAC could be generated for all satellites or for different groups of satellites. In the latter case, the common MAC may use one or more satellite IDs as a basis. Only for reasons of simplicity it will be assumed that there is a common MAC for all satellites and that one satellite ID is used as input.

The generation and use of MACs may comply with the planned Galileo standard, which still has to be defined.

One option has been described by Fernandez-Hernandez, Rijmen, Seco-Granados, Simon, Rodriguez and Calle in "A Navigation Message Authentication Proposal for the Galileo Open Service" in Navigation: Journal of the Institute of Navigation, Vol. 63, No. 1, Spring 2016, pages 85-102. It makes use of a Time Efficient Stream Loss-tolerant Authentication (TESLA) protocol. TESLA is based on the transmission of a MAC to authenticate the plaintext message and the delayed transmission of the key used to compute the MAC. This key belongs to a chain generated through a one-way function F. The chain starts with a random seed key, which is secret, and ends with a root key that is public and certified as authentic. GNSS authentication through TESLA could be performed in the following way: The receiver receives the navigation data and the MAC. The receiver later receives a key from which the MAC can be generated. The receiver authenticates the key with a previous key from the chain that is considered authentic, or the root key, by performing function F the required number of times. The receiver re-generates the MAC with the key and the data, which should coincide with the previously received MAC. The generation of the MAC takes account of the navigation data and of the time for which the data is valid. For further details and suggested variations reference is made to the document.

Global monitoring network 500 provides the harvested data to the global assistance data servers 510 using encryption and VPN. The data may be provided in the encrypted and digitally signed form as received by the global monitoring network 500, along with any digital signatures, and along with MACs and one-time keys for Galileo.

GSA entity 530 may generate MACs for Galileo navigation data and forward the MACs and associated one-time keys used for generating the MACs to Galileo satellites 540 for broadcast. Whenever a seed key is replaced, GSA entity 530 may provide global assistance data servers 510 with the updated seed key and optionally with an associated updated root key using a secure link.

Server 511, as an example global assistance data server, receives navigation data of satellites 540, 550 of different satellite navigation systems from global monitoring network 500. The received data may include data from different monitoring receivers of global monitoring network 500. In addition, server 511 receives Galileo MACs and associated one-time keys for the navigation data. The MACs and associated keys may be received from global monitoring network 500 as extracted from the satellite signals. When a stored seed key expires, server 511 may receive an updated seed key from GSA entity 530. It may generate and store an associated root key based on the updated seed key, or store an updated root key that is received from GSA entity 530 along with the updated seed key.

The reception of the data may be a continuous process, so that current navigation data is always available at server 511. The data that is received by server 511 from global monitoring network 500 may optionally be limited to data that is provided by monitoring receivers in a specific region.

At some point in time, mobile device 520 may require positioning assistance data from server 511. Assistance data will only be provided by server 511, however, in case mobile device 520 can be authenticated by means of a MAC.

Mobile device 520 therefore generates a MAC for a given time instant in the future—if required taking account of a predetermined satellite ID—based on the securely embedded seed key. (action 621) The time instant is selected by mobile device 520. It may be set for instance generally to one hour ahead of the current time, or to any other time.

Mobile device 520 applies in addition a hash function to the generated MAC to derive a secondary code as verification code. (action 622)

Mobile device 520 assembles an assistance data request message. (action 623) For the actual request, parameters may be included in the message, like a time period for which assistance data is required and/or a rate at which new assistance data is desired. A request for further sensitive data may be included as well. In addition, the assistance request message includes the derived secondary code, an indication of a time instant for which the underlying MAC has been generated, and a subscription identifier (ID). The subscription ID may correspond for instance to a receiver ID, to a mobile device ID or be an ID that is assigned when mobile device 520 registers for A-GNSS service.

Mobile device 520 causes a transmission of the assembled message to server 511. (action 624) Using a hash function for obtaining the verification code has the effect that the MAC cannot be determined based on the transmitted verification code. Thus, the risk to expose the true future MAC over the air interface is removed.

Server 511 obtains the message and extracts the included information. (action 611)

Once server 511 has checked the subscription ID, server 511 generates a MAC for the indicated given time instant based on the stored seed key. (action 612)

Server 511 applies a hash function to the generated MAC to derive a secondary code as verification code. (action 613)

Server 511 compares the derived secondary code with the secondary code extracted from the received message. (action 614)

If there is no match (action 615), server 511 considers the GNSS receiver of mobile device 520 not to be authenticated and thus not to be trusted. As a result, it may simply ignore the request. Alternatively, it may send an error message to mobile device 520, as there may a plausible reason for the mismatch, like an outdated seed key. In this context, server 511 may also request mobile device 520 to transmit a currently stored root key, which may enable server 511 to determine whether the root key is outdated. Server 511 may then provide a corresponding hint to mobile device 520 so that the user may obtain an updated root key and possibly an updated seed key. Alternatively or in addition, server 511 may provide the updated root key to mobile device 520. An updated root key may enable mobile device 520 again to process at least broadcast Galileo signals during good reception conditions. (action 616)

If there is a match (action 615), server 511 considers the GNSS receiver of mobile device 520 authentic and trusted. Thus, server 511 validates the request and allows a response including sensitive data. It assembles the requested assistance data in subsequent response messages for each desired time instant, possibly taking account of received parameters and/or of subscription parameters stored for the received subscriber ID. (action 617) The assembled assistance data may include for instance navigation data for various GNSSs and a currently valid Galileo MAC encapsulated into a single encrypted message. The encryption may be based for instance on a private key that is used in common by all global assistance data servers 510. The message may include further data that does not constitute actual GNSS assistance data, for instance digital signatures that have been provided by Galileo satellites 540 and forwarded by global monitoring network 500, configuration data associated with requesting mobile device 520, an IP-address of server 511, certificates, and/or other sensitive data. A one-time key enabling a generation of a Galileo MAC in a respective message may optionally be included in the respective subsequent message.

Server 511 causes transmission of each response message to mobile device 520. (action 618)

Mobile device 520 receives the response messages. It may store a public key corresponding to a private key used by server 511 for encrypting the encrypted response messages. Mobile device 520 may decode the messages using this stored public key. Mobile device 520 may furthermore store a public key corresponding to the private key that has been used for encoding and signing at least a part of the data transmitted by satellites 540, 550. Mobile device 520 may decode the encoded data, including the MAC, and verify its source using the public key. Mobile device 520 then validates authenticity of the included navigation data for all satellite navigation systems and any included further data based on the included MAC for Galileo. The MAC may be verified by mobile device 520 for instance by computing MAC based on satellite identifier(s) for Galileo, the time for which the navigation data is indicated to be valid, provided one-time keys and the stored root key, using some implemented function or functions; and by comparing the computed MAC with the received MAC. The availability and verification of the employed key may comply with any Galileo standardization that defines the use of MAC for Galileo. Alternatively, mobile device 520 could also compute MACs for comparison based on the embedded seed key, instead of provided one-time keys and the stored root key.

If the MAC received for Galileo is determined to be valid, mobile device 520 considers the navigation data for all satellite navigation systems and any further sensitive data received in the same response message to be authentic, not only the navigation data for Galileo. Mobile device 520 may now use the received assistance data for position and/or velocity and/or time (PVT) computations. Other included data may be processed as required. (action 625) If the MAC received for Galileo in a response message is determined not to be valid, mobile device 520 may discard the entire response message.

In a variation, different MACs may be generated in action 621 for different satellite IDs, leading to several derived secondary codes to be included in the assistance request message in action 623. In this case, several MACs and secondary codes will be used and considered in the entire system for each time instant.

In a variation, mobile device 520 may apply an encryption to the generated MAC instead of the hashing to obtain the secondary code in action 622. In this case server 511 may either encrypt the generated MAC in the same manner to derive a secondary code for the comparison in action 614; or it may decrypt the received secondary code to reconstruct the MAC generated by mobile device 520 for comparison in action 614 with the MAC generated in action 612.

In a variation, server 511 does not necessarily have to store a seed key. It could also obtain in regular intervals a respective list of future MACs for various time instants from GSA entity 530. Server 511 may then extract a MAC for a given time instant from this list in action 612.

In a variation, the secondary code is not included in an assistance request message in action 623. It may be included for instance in a preceding handshaking message instead. The actual assistance request may then be assembled and transmitted when server 511 detects a match in action 615 and informs mobile device 520 that the handshaking has been successful.

In alternative or additional operations in the system of FIG. 5, mobile devices 520 and 521 may use basically the same approach for authenticating their GNSS receivers among each other, e.g. before transmitting location information to a trusted mobile device only, or before using transmitted location information from a trusted mobile device only. Mobile devices 520, 521 may authenticate their GNSS receivers and thereby the data they exchange by exchanging MACs for a given time instant that have been generated with embedded seed keys in handshaking messages or in data transmission messages. If the MACs (or derived secondary codes) match, the data and/or the devices are considered to be trusted.

Figure 7:
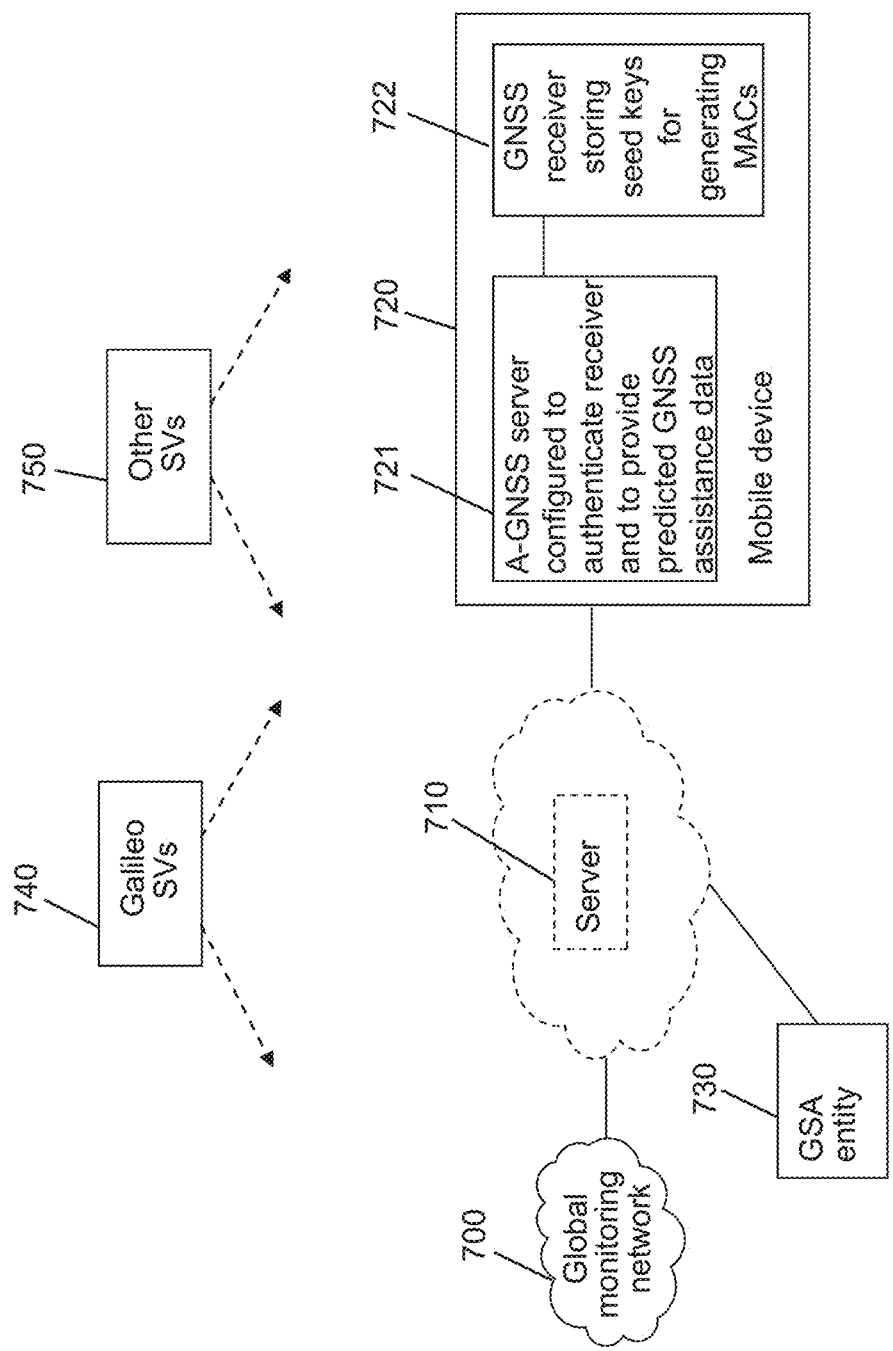
FIG. 7 is a schematic block diagram of another example embodiment of a comprehensive system.

FIG. 7 is a schematic block diagram of another example embodiment of a comprehensive system supporting an authentication of satellite navigation system receivers, and illustrates some possible (further) variations compared to the system of FIG. 5.

The system comprises again a global monitoring network 700, global assistance data servers 710, a mobile device 720 and a GSA entity 730. GNSS satellites 740, 750 broadcast satellite signals, which include navigation data. The GNSS satellites include Galileo satellites 740 and optionally satellites 750 of at least one further satellite navigation system, including for instance GPS, GLONASS, Beidou and/or one or more SBAS.

The global monitoring network 700 comprises monitoring receivers that are configured to receive satellite signals from respectively visible GNSS satellites 740, 750. The monitoring receivers are configured to extract and forward navigation data and associated data from the signals. They may be distributed across the world.

The global assistance data servers 710 are distributed across the world as well. Each of the servers is configured to receive data collected by the global monitoring network 700, and to assemble and provide information including GNSS assistance data and optionally further sensitive data upon request of mobile devices 720. It is to be understood that the functions of the global assistance data servers 710 may also be performed in the cloud in a distributed manner. The global monitoring network 700 is linked to the global assistance data servers 710 by means of safe connections.

GSA entity 730 may be configured to generate MACs for current and future time instants. It may optionally be linked to the global assistance data servers 710 via a safe connection as well.

Mobile device 720 may be any device that is configured to move around and that is expected to be able to determine its own position. It may be again for instance a smartphone, a smart watch, a tablet PC, an IoT device or any other mobile device, including industrially used devices. Mobile device 720 comprises an integrated A-GNSS server 721 and a GNSS receiver (or chipset) 722. A-GNSS server 721 is configured to authenticate GNSS receiver 722 and to provide predicted GNSS assistance data. GNSS receiver 722 is configured to receive signals from Galileo satellites 740 and optionally from other GNSS satellites 750. A-GNSS service is an integral part of GNSS receiver 722. GNSS receiver 722 is a certified OS-NMA receiver. It comprises at least one seed key for generating MACs for its own authentication, embedded into firmware. A-GNSS server 721 may be for instance an embodiment of system 100 of FIG. 1 and include corresponding components. In this case, interfaces 104 may enable a data communication with servers 710, for instance via the Internet, and GNSS receiver 722 via an internal connection, like open/de facto APIs existing on the GNSS receiver 722; and data memory 103 may enable storage of received assistance data and associated data. Alternatively, a software entity embedded/installed on mobile device 320 in order to bring authenticated assistance data services to mobile device 320 may be considered to constitute A-GNSS server 721. GNSS receiver 722 may be for instance an embodiment of system 300 of FIG. 3 and include corresponding components. In this case, interfaces 304 may enable a data communication with A-GNSS server 721 via an internal connection, and data memory 103 may enable storage of received assistance data.

Figure 8:
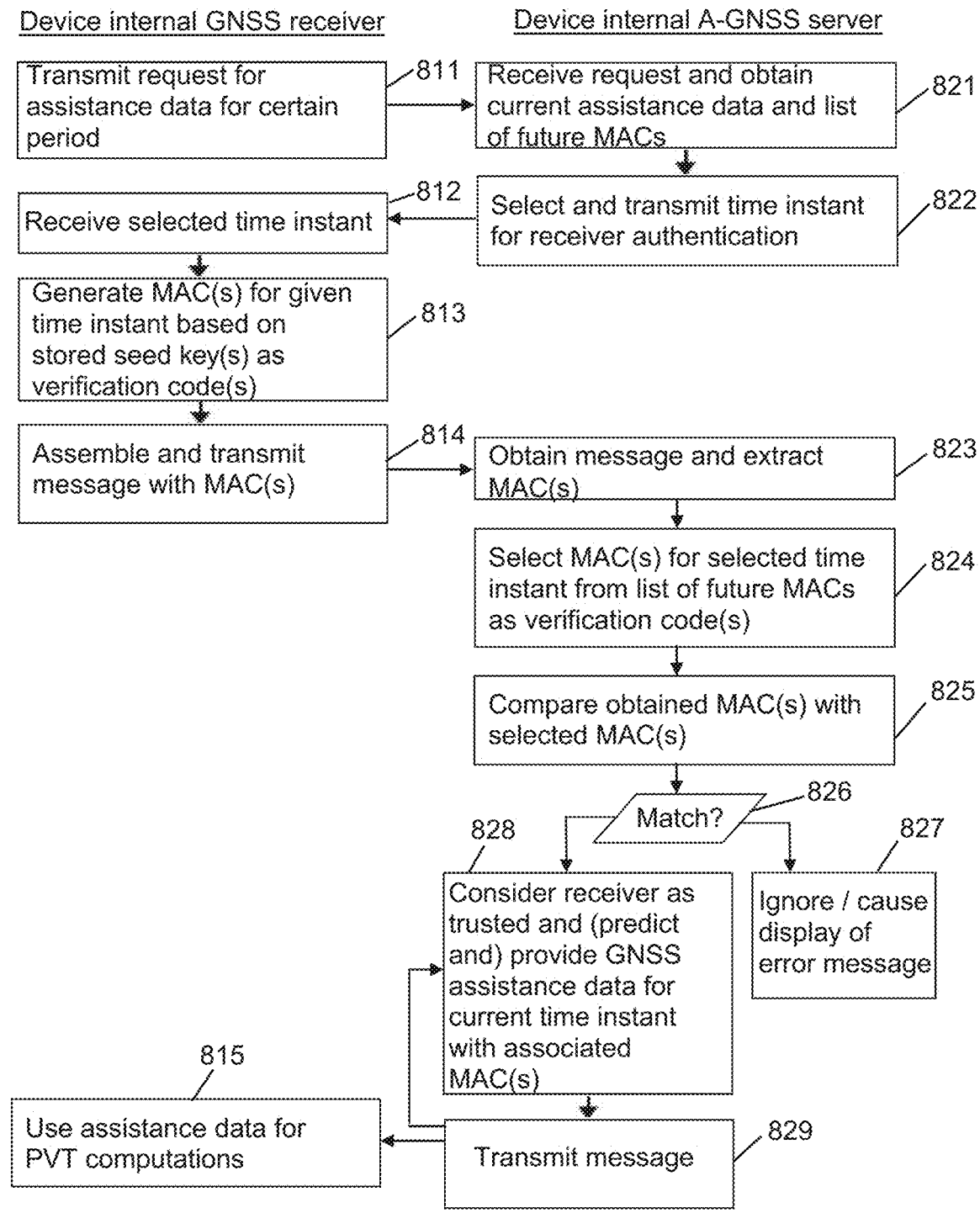
FIG. 8 is a flow chart illustrating an example embodiment of operations in the system of FIG. 7.

FIG. 8 is a flow chart illustrating example operations in the system of FIG. 7. GNSS receiver 722 of mobile device 720 is caused to perform the actions presented on the left hand side. A-GNSS server 721 of mobile device 720 is caused to perform the actions presented on the right hand side.

Server 710 receives raw assistance data for a plurality of GNSSs, including Galileo, from global monitoring network 700 via a secure link. The received data may include data from different monitoring receivers of global monitoring network 700. For Galileo, the assistance data may be associated with MACs enabling an authentication of the assistance data. The reception of the data may be a continuous process, so that current assistance data is always available.

In addition, server 710 receives future MACs from GSA entity 730 via a secure link on a regular basis. They may be received for instance once a day for a day two weeks ahead.

At some point in time, mobile device 720 may need assistance data enabling an offline mode for a certain period of time.

In this case, GNSS receiver 722 transmits an internal request for assistance data for this period to A-GNSS server 721. (action 811)

A-GNSS server 721 receives the request from GNSS receiver 722 and obtains thereupon assistance data for a current time instant as well as a list of future MACs from server 710. (action 821)

The assistance data may be obtained by A-GNSS server 721 upon a request indicating future time instants for which keys are desired, for instance every two hours within a period of two weeks. In response to the request, server 710 may assemble GNSS assistance data for mobile device 720. The assembled assistance data includes assistance data for Galileo for a current time, which is based on received raw assistance data. The assembled assistance data may include assistance data for other GNSSs for the current time, which is based on received raw assistance data. The assembled assistance data includes at least one MAC for the Galileo assistance data for the current time, as received from global monitoring network 700. Finally, the assembled assistance data includes a list of MACs for the requested time instants, selected from the MACs received in advance from GSA entity 730. Server 710 may encapsulate the assembled data into a single encrypted message and transmit the message as A-GNSS response to mobile device 720. The encryption may be based for instance on a private key that is used in common by all global assistance data servers 710. The message may include further data that does not constitute actual GNSS assistance data, for instance digital signatures that have been provided by Galileo satellites 740 and forwarded by global monitoring network 700, configuration data associated with requesting mobile device 720, an IP-address of server 710, certificates, and/or other sensitive data. A-GNSS server 721 may store a public key corresponding to a private key used by server 710 for encrypting the encrypted A-GNSS message. A-GNSS server 721 may decrypt the message using this stored public key.

A-GNSS server 721 selects a time instant from among the time instants for which future assistance data and MACs are provided. It includes an indication of this time instant in a message and transmits it to GNSS receiver 722 for the purpose of receiver authentication. (action 822)

GNSS receiver 722 receives the indication of the selected time instant. (action 812)

GNSS receiver 722 generates at least one MAC for the given time instant and for one or more satellite IDs based on the embedded seed key as at least one verification code. (action 813)

GNSS receiver 722 assembles a message with the at least one MAC and transmits it to A-GNSS server 721. (action 814)

A-GNSS server 721 obtains the message and extracts the at least one MAC. (action 823)

A-GNSS server 721 selects at least one MAC for the time instant selected in action 822 from the list of future MACs as at least one verification code. (action 824)

A-GNSS server 721 compares the at least one MAC obtained from GNSS receiver 722 with the at least one selected MAC. (action 825)

If there is no match (action 826), A-GNSS server 721 considers GNSS receiver 722 not to be authentic. In this case, it ends the operation or displays an error message on a display of mobile device 720. (action 827)

If there is a match (action 826), A-GNSS server 721 considers GNSS receiver 722 to be authentic. In this case, it assembles a message including the received assistance data for the current time and the associated at least one MAC. (action 827)

A-GNSS server 721 transmits the assembled message to GNSS receiver 722. (action 829)

If the at least one MAC was accepted in action 826, A-GNSS server 721 moreover predicts assistance data for all GNSSs for the next time instant for which at least one MAC is provided in the list of MACs within the selected period, when this time instant is upcoming. The prediction may include for instance a prediction of satellite orbit and clock models for all satellites 740, 750 for which assistance data has been received. A-GNSS server 721 furthermore associates at least one MAC from the list of MACs for the respective time instant with the predicted assistant data. A-GNSS server 721 assembles the predicated assistance for a respective time instant and the associated at least one MAC in a message and transmits the message to GNSS receiver 722. (actions 828, 829)

GNSS receiver 722 receives all messages subsequently. It may process the included predicted GNSS assistance data like regular GNSS assistance data and/or like navigation messages broadcast by satellites 740, 750. This includes a verification of the at least one MAC that is included in the message for the time instant for which the assistance data is valid. The at least one MAC may be verified for instance using the seed key for generating at least one MAC for comparison, or any other way. GNSS receiver 722 may use validated original and predicted assistance data e.g. for position and/or velocity and/or time computations in an offline mode. (action 815) If assistance data for other systems than Galileo is included, a valid MAC may not only be used to authenticate Galileo related data, but also the data for other GNSSs for the current time included in the same encrypted message from server 710, and optionally further associated data in this message as well.

The operations presented with reference to FIG. 8 may ensure for instance that software providing an A-GNSS service in a device can only be used in cooperation with a certified GNSS receiver in the device.

It is to be understood that in the approach presented with reference to FIG. 6 as well as in the approach presented with reference to FIG. 8, any desired additional encryption and authentication schemes not mentioned may be included for any of the indicated links and communications in order to increase the total level of security.

It is to be understood that the presented example systems, apparatuses and operations may generally be varied in many ways. The systems and apparatuses may be varied for instance by modifying, adding or omitting components. The operations may be varied for instance by modifying actions, by omitting actions and/or by adding actions. In addition, the order of actions may be modified.

Summarized, certain embodiments of the invention may support an authentication of a GNSS receiver that is based on Galileo message authentication. They may be beneficial, for instance, in case confidential information is to be provided and/or in case applications or services require a high confidence and reliability for positioning.

The following embodiments of the invention are also disclosed:

Embodiment 1

A method comprising, performed by at least one device:
obtaining a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;
comparing the at least one obtained verification code with at least one available verification code known to be valid for the given time instant, wherein the entity is considered to be an authentic satellite navigation system receiver of a mobile device only, in case the at least one obtained verification code matches the at least one available verification code; and
enabling selected further actions only, if the entity is considered an authentic satellite navigation system receiver of a mobile device.

Embodiment 2

The method according to embodiment 1, wherein the further actions comprise at least one of:
providing a service to the satellite navigation system receiver; and/or
providing positioning assistance data to the satellite navigation system receiver; and/or
providing predicted positioning assistance data and associated future message authentication codes to the satellite navigation system receiver; and/or
accepting location information of the entity included in the message to be authentic; and/or
transmitting information on the location of the at least one device to the satellite navigation system receiver.

Embodiment 3

The method according to embodiment 1 or 2, further comprising causing transmission of the given time instant for which at least one verification code is desired to the entity.

Embodiment 4

The method according to any one of embodiments 1 to 3, wherein the at least one available verification code comprises one of:
at least one message authentication code extracted by the at least one device from a list of message authentication code received from an entity of a trusted source; or
at least one secondary code derived by the at least one device from at least one message authentication code extracted by the at least one device from a list of message authentication code received from an entity of a trusted source; or
at least one secondary code extracted by the at least one device from a list of message authentication code received from an entity of a trusted source; or
at least one message authentication code generated by the at least one device based on at least one stored confidential seed key; or
at least one secondary code derived by the at least one device from at least one message authentication code generated by the at least one device based on at least one stored confidential seed key.

Embodiment 5

The method according to any one of embodiments 1 to 4, wherein the obtained message is one of:
a message comprising a positioning assistance data request; or
a handshaking message in the scope of assistance data service communication;
a message designed for peer-to-peer communications between mobile devices comprising satellite navigation system receivers; or
a message designed for communications between a mobile device comprising a satellite navigation system receiver and a device offering a location based service; or
an internal message in a mobile device comprising the satellite navigation system receiver.

Embodiment 6

A system comprising at least one apparatus, the at least one apparatus comprising means for causing performance of the actions of the method of any one of embodiments 1 to 5.

Embodiment 7

The system according to embodiment 6, wherein the system is:
- a module for a computer; or
- a computer; or
- a combination of a plurality of computers; or
- a device comprising a server that is external to the mobile device comprising the satellite navigation system receiver and that is configured to provide assistance data to a plurality of satellite navigation system receivers; or
- a module for the mobile device comprising the satellite navigation system receiver; or
- the mobile device comprising the satellite navigation system receiver; or
- a module for a mobile device that is separate from the mobile device comprising the satellite navigation system receiver; or
- a mobile device that is separate from the mobile device comprising the satellite navigation system receiver.

Embodiment 8

A system comprising at least one processor and at least one memory, wherein the at least one memory includes computer program code, the at least one memory and the computer program code configured to, with the at least one processor, cause at least one device at least to:
- obtain a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;
- compare the at least one obtained verification code with at least one available verification code known to be valid for the given time instant, wherein the entity is considered to be an authentic satellite navigation system receiver of a mobile device only, in case the at least one obtained verification code matches the at least one available verification code; and
- enable selected further actions only, if the entity is considered an authentic satellite navigation system receiver of a mobile device.

Embodiment 9

The system according to embodiment 8, wherein the at least one memory and the computer program code are further configured to, with the at least one processor, cause the at least one device to perform at least one of:
- provide a service to the satellite navigation system receiver; and/or
- providing positioning assistance data to the satellite navigation system receiver; and/or
- provide predicted positioning assistance data and associated future message authentication codes to the satellite navigation system receiver; and/or
- accept location information of the entity included in the message to be authentic; and/or
- transmit information on the location of the at least one device to the satellite navigation system receiver.

Embodiment 10

The system according to embodiment 8 or 9, wherein the at least one memory and the computer program code are further configured to, with the at least one processor, cause the at least one device to cause transmission of the given time instant for which at least one verification code is desired to the entity.

Embodiment 11

The system according to any one of embodiments 8 to 10, wherein the at least one available verification code comprises one of:
- at least one message authentication code extracted by the at least one device from a list of message authentication code received from an entity of a trusted source; or
- at least one secondary code derived by the at least one device from at least one message authentication code extracted by the at least one device from a list of message authentication code received from an entity of a trusted source; or
- at least one secondary code extracted by the at least one device from a list of message authentication code received from an entity of a trusted source; or
- at least one message authentication code generated by the at least one device based on at least one stored confidential seed key; or
- at least one secondary code derived by the at least one device from at least one message authentication code generated by the at least one device based on at least one stored confidential seed key.

Embodiment 12

The system according to any one of embodiments 8 to 11, wherein the obtained message is one of:
- a message comprising a positioning assistance data request; or
- a handshaking message in the scope of assistance data service communication;
- a message designed for peer-to-peer communications between mobile devices comprising satellite navigation system receivers; or
- a message designed for communications between a mobile device comprising a satellite navigation system receiver and a device offering a location based service; or
- an internal message in a mobile device comprising the satellite navigation system receiver.

Embodiment 13

The system according to any of embodiments 8 to 12, wherein the system is:
- a module for a computer; or
- a computer; or
- a combination of a plurality of computers; or a device comprising a server that is external to the mobile device comprising the satellite navigation system receiver and that is configured to provide assistance data to a plurality of satellite navigation system receivers; or a module for the mobile device comprising the satellite navigation system receiver; or the mobile device comprising the satellite navigation system receiver; or a module for a mobile device that is separate from the mobile device comprising the satellite navigation system receiver; or a mobile device that is separate from the mobile device comprising the satellite navigation system receiver.

Embodiment 14

A computer program code, which is configured to causes at least one device to perform the actions of the methods of any one of embodiments 1 to 5 when executed by at least one processor.

Embodiment 15

A computer readable storage medium in which computer program code is stored, the computer program code causing at least one device to perform the following when executed by at least one processor:

obtain a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;

compare the at least one obtained verification code with at least one available verification code known to be valid for the given time instant, wherein the entity is considered to be an authentic satellite navigation system receiver of a mobile device only, in case the at least one obtained verification code matches the at least one available verification code; and enable selected further actions only, if the entity is considered an authentic satellite navigation system receiver of a mobile device.

Embodiment 16

A method comprising, performed by a mobile device with satellite navigation system receiver:

generating at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver;

assembling a message including at least one verification code, wherein the at least one verification code comprises the generated at least one message authentication code or at least one secondary code derived from the generated at least one message authentication code; and causing a transmission of the assembled message to enable a receiving entity to authenticate the satellite navigation system receiver.

Embodiment 17

The method according to embodiment 16, wherein the given time instant is received in a message from the receiving entity.

Embodiment 18

The method according to any one of embodiments 16 and 17, wherein the assembled message is one of:

a message comprising a positioning assistance data request; or a handshaking message in the scope of assistance data service communication;

a message designed for peer-to-peer communications between mobile devices comprising satellite navigation system receivers; or a message designed for communications between a mobile device comprising a satellite navigation system receiver and a device offering a location based service; or an internal message in a mobile device comprising the satellite navigation system receiver.

Embodiment 19

An apparatus comprising means for causing a mobile device with satellite navigation system receiver to perform the actions of the method of any of embodiments 16 to 18.

Embodiment 20

The apparatus according to embodiment 19, wherein the apparatus is at least one of:

a satellite navigation system receiver; and/or
a user device; and/or
a handheld device; and/or
a mobile device; and/or
a module for a device.

Embodiment 21

An apparatus comprising at least one processor and at least one memory, wherein the at least one memory includes computer program code, the at least one memory and the computer program code configured to, with the at least one processor, cause a mobile device with satellite navigation system receiver at least to:

generate at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver;

assemble a message including at least one verification code, wherein the at least one verification code comprises the generated at least one message authentication code or at least one secondary code derived from the generated at least one message authentication code; and cause a transmission of the assembled message to enable a receiving entity to authenticate the satellite navigation system receiver.

Embodiment 22

The apparatus according to embodiment 21, wherein the given time instant is received in a message from the receiving entity.

Embodiment 23

The apparatus according to any one of embodiments 21 and 22, wherein the assembled message is one of:
a message comprising a positioning assistance data request; or
a handshaking message in the scope of assistance data service communication;
a message designed for peer-to-peer communications between mobile devices comprising satellite navigation system receivers; or
a message designed for communications between a mobile device comprising a satellite navigation system receiver and a device offering a location based service; or
an internal message in a mobile device comprising the satellite navigation system receiver.

Embodiment 24

The apparatus according to any one of embodiments 21 and 23, wherein the apparatus is at least one of:
a satellite navigation system receiver; and/or
a user device; and/or
a handheld device; and/or
a mobile device; and/or
a module for a device.

Embodiment 25

A computer program code, which is configured to causes at least one device to perform the actions of the method of any of embodiments 16 to 18 when executed by at least one processor.

Embodiment 26

A computer readable storage medium in which computer program code is stored, the computer program code causing at least one device to perform the following when executed by at least one processor:
generate at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver;
assemble a message including at least one verification code, wherein the at least one verification code comprises the generated at least one message authentication code or at least one secondary code derived from the generated at least one message authentication code; and
cause a transmission of the assembled message to enable a receiving entity to authenticate the satellite navigation system receiver.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102 can also be viewed as means for obtaining a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant; means for comparing the at least one obtained verification code with at least one available verification code known to be valid for the given time instant, wherein the entity is considered to be an authentic satellite navigation system receiver of a mobile device only, in case the at least one obtained verification code matches the at least one available verification code; and means for enabling selected further actions only, if the entity is considered an authentic satellite navigation system receiver of a mobile device.

The program code in memory 102 can also be viewed as comprising such means in the form of functional modules.

The functions illustrated by processor 301 in combination with memory 302, can also be viewed as means for generating at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver; means for assembling a message including at least one verification code, wherein the at least one verification code comprises the generated at least one message authentication code or at least one secondary code derived from the generated at least one message authentication code; and means for causing a transmission of the assembled message to enable a receiving entity to authenticate the satellite navigation system receiver.

The program codes in memory 302 can also be viewed as comprising such means in the form of functional modules.

FIGS. 2, 4, 6 and 8 may also be understood to represent example functional blocks of computer program codes supporting an authentication of a satellite navigation system receiver.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method, performed by an assistance server, comprising:
    obtaining a message at the assistance server, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;
    comparing, by the assistance server, the at least one verification code with at least one available verification code known to be valid for the given time instant, wherein the entity is considered to be an authentic satellite navigation system receiver of a mobile device when the at least one verification code matches the at least one available verification code; and
    providing positioning assistance data when the entity is considered the authentic satellite navigation system receiver of the mobile device.

2. The method according to claim 1, wherein the positioning assistance data provided to the satellite navigation system receiver includes predicted positioning assistance data and associated future message authentication codes provided to the satellite navigation system receiver.

3. The method according to claim 1, further comprising:
    causing transmission of the given time instant for which at least one verification code is desired to the entity.

4. The method according to claim 1, wherein the at least one available verification code comprises one of:
    at least one message authentication code extracted by the assistance server from a list of message authentication code received from an entity of a trusted source; or
    at least one secondary code derived by the assistance server from at least one message authentication code extracted by assistance server from a list of message authentication code received from an entity of a trusted source; or
    at least one secondary code extracted by the assistance server from a list of message authentication code received from an entity of a trusted source; or
    at least one message authentication code generated by the assistance server based on at least one stored confidential seed key; or
    at least one secondary code derived by the assistance server from at least one message authentication code generated by the assistance server based on at least one stored confidential seed key.

5. The method according to claim 1, wherein the obtained message is one of:
    a message comprising a positioning assistance data request; or
    a handshaking message of assistance data service communication;
    a message designed for peer-to-peer communications between mobile devices comprising satellite navigation system receivers; or
    a message designed for communications between a mobile device comprising a satellite navigation system receiver and a device offering a location based service; or
    an internal message in a mobile device comprising the satellite navigation system receiver.

6. An assistance server comprising at least one processor and at least one memory, wherein the at least one memory includes computer program code, the at least one memory and the computer program code configured to, with the at least one processor, cause the assistance server at least to:
    obtain, at the assistance server, a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;
    compare, at the assistance server, the at least one verification code with at least one available verification code known to be valid for the given time instant, wherein the entity is considered to be an authentic satellite navigation system receiver of a mobile device in case the at least one verification code matches the at least one available verification code; and enable a selected positioning action if the entity is considered an authentic satellite navigation system receiver of a mobile device.

7. The assistance server according to claim 6, wherein the at least one memory and the computer program code are further configured to, with the at least one processor, cause the at least one device to perform at least one of:

positioning assistance data to the satellite navigation system receiver; and/or provide predicted positioning assistance data and associated future message authentication codes to the satellite navigation system receiver; and/or accept location information of the entity included in the message to be authentic; and/or transmit information on the location of the assistance server to the satellite navigation system receiver.

8. The assistance server according to claim 6, wherein the at least one memory and the computer program code are further configured to, with the at least one processor, cause the assistance server to cause transmission of the given time instant for which at least one verification code is desired to the entity.

9. The assistance server according to claim 6, wherein the at least one available verification code comprises one of:

at least one message authentication code extracted by the assistance server from a list of message authentication code received from an entity of a trusted source; or at least one secondary code derived by the assistance server from at least one message authentication code extracted by the assistance server from a list of message authentication code received from an entity of a trusted source; or at least one secondary code extracted by the assistance server from a list of message authentication code received from an entity of a trusted source; or at least one message authentication code generated by the assistance server based on at least one stored confidential seed key; or at least one secondary code derived by the assistance server from at least one message authentication code generated by the assistance server based on at least one stored confidential seed key.

10. The assistance server according to claim 6, wherein the obtained message is one of:

a message comprising a positioning assistance data request; or a handshaking message in assistance data service communication;

a message designed for peer-to-peer communications between mobile devices comprising satellite navigation system receivers; or a message designed for communications between a mobile device comprising a satellite navigation system receiver and a device offering a location based service; or an internal message in a mobile device comprising the satellite navigation system receiver.

11. The assistance server according to claim 6, wherein the assistance server is:

a module for a computer; or a computer; or a combination of a plurality of computers; or a device comprising a server that is external to the mobile device comprising the satellite navigation system receiver and that is configured to provide assistance data to a plurality of satellite navigation system receivers; or a module for the mobile device comprising the satellite navigation system receiver; or the mobile device comprising the satellite navigation system receiver; or a module for a mobile device that is separate from the mobile device comprising the satellite navigation system receiver; or a mobile device that is separate from the mobile device comprising the satellite navigation system receiver.

12. A non-transitory computer readable storage medium in which computer program code is stored, the computer program code causing an assistance server to perform the following when executed by at least one processor:

obtain, at the assistance server, a message, which includes at least one verification code, from an entity indicating to be a satellite navigation system receiver of a mobile device, the at least one verification code comprising at least one message authentication code for a given time instant or at least one secondary code derived from least one message authentication code for a given time instant, wherein message authentication codes are defined to authenticate navigation data for Galileo for a respective time instant;

compare, at the assistance server, the at least one verification code with at least one available verification code known to be valid for the given time instant, wherein the entity is considered to be an authentic satellite navigation system receiver of a mobile device in case the at least one verification code matches the at least one available verification code; and enable a selected positioning action if the entity is considered an authentic satellite navigation system receiver of a mobile device.

13. A method, performed by a mobile device with satellite navigation system receiver, the method comprising:

generating at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver;

assembling a message comprising a positioning assistance data request including at least one verification code, wherein the at least one verification code comprises the generated at least one message authentication code or at least one secondary code derived from the generated at least one message authentication code; and causing a transmission of the assembled message to enable an assistance server to authenticate the satellite navigation system receiver and enable a selected positioning action in response to the authentication of the satellite navigation system receiver.

14. The method according to claim 13, wherein the given time instant is received in a message from the assistance server.

15. The method according to claim 13, wherein the assembled message is one of:

a message comprising a positioning assistance data request; or a handshaking message in assistance data service communication;

a message designed for peer-to-peer communications between mobile devices comprising satellite navigation system receivers; or a message designed for communications between a mobile device comprising a satellite navigation system receiver and a device offering a location based service; or an internal message in a mobile device comprising the satellite navigation system receiver.

16. An apparatus comprising at least one processor and at least one memory, wherein the at least one memory includes computer program code, the at least one memory and the computer program code configured to, with the at least one processor, cause a mobile device with satellite navigation system receiver at least to:

generate at least one message authentication code for a given time instant based on at least one confidential seed key, wherein message authentication codes are defined to authenticate navigation data for Galileo for a respective time instant and wherein the at least one confidential seed key is securely embedded in the satellite navigation system receiver;

assemble a message comprising a positioning assistance data request including at least one verification code, wherein the at least one verification code comprises the generated at least one message authentication code or at least one secondary code derived from the generated at least one message authentication code; and cause a transmission of the assembled message to enable an assistance server to authenticate the satellite navigation system receiver and enable a selected positioning action in response to the authentication of the satellite navigation system receiver.

17. The apparatus according to claim 16, wherein the given time instant is received in a message from the assistance server.

18. The apparatus according to claim 16, wherein the assembled message is one of:

a message comprising a positioning assistance data request; or a handshaking message in assistance data service communication;

a message designed for peer-to-peer communications between mobile devices comprising satellite navigation system receivers; or a message designed for communications between a mobile device comprising a satellite navigation system receiver and a device offering a location based service; or an internal message in a mobile device comprising the satellite navigation system receiver.

19. The apparatus according to claim 16, wherein the apparatus is at least one of:

a satellite navigation system receiver; and/or
a user device; and/or
a handheld device; and/or
a mobile device; and/or
a module for a device.

20. A non-transitory computer readable storage medium in which computer program code is stored, the computer program code causing at least one device to perform the following when executed by at least one processor:

generate at least one message authentication code for a given time instant based on at least one confidential seed key, wherein message authentication codes are defined to authenticate navigation data for Galileo for a respective time instant and wherein the at least one confidential seed key is securely embedded in a satellite navigation system receiver;

assemble a message comprising a positioning assistance data request including at least one verification code, wherein the at least one verification code comprises the generated at least one message authentication code or at least one secondary code derived from the generated at least one message authentication code; and cause a transmission of the assembled message to enable an assistance server to authenticate the satellite navigation system receiver and enable a selected positioning action in response to the authentication of the satellite navigation system receiver.

* * * * *

UNITED STATES PATENT AND TRADEMARK OFFICE
CERTIFICATE OF CORRECTION

PATENT NO. : 10,694,382 B2  
APPLICATION NO. : 15/634011  
DATED : June 23, 2020  
INVENTOR(S) : Jari Tapani Syrjarinne Page 1 of 1

It is certified that error appears in the above-identified patent and that said Letters Patent is hereby corrected as shown below:

In the Claims

Claim 7, Column 27, Line 11. Insert -- providing -- before "positioning assistance".

Signed and Sealed this  
Fifteenth Day of December, 2020

Andrei Iancu  
*Director of the United States Patent and Trademark Office*